US005688066A

United States Patent [19]
Loose

[11] Patent Number: 5,688,066
[45] Date of Patent: Nov. 18, 1997

[54] EXPANSION DOWEL

[75] Inventor: Rainer Loose, Marktoberdorf, Germany

[73] Assignee: Hilti Aktiengesellschaft, Schaan, Luxembourg

[21] Appl. No.: 620,230

[22] Filed: Mar. 22, 1996

[30] Foreign Application Priority Data

Mar. 22, 1995 [DE] Germany ................. 195 10 306.8

[51] Int. Cl.⁶ ................................................. F16B 13/04
[52] U.S. Cl. ........................... 403/297; 411/45; 411/57
[58] Field of Search ................................ 403/292, 294, 403/297; 411/45, 57, 60

[56] References Cited

U.S. PATENT DOCUMENTS

| 3,808,938 | 5/1974 | Chromy | 411/57 |
| 4,312,604 | 1/1982 | Fu et al. | 411/60 X |
| 4,602,902 | 7/1986 | Herb | 411/60 X |
| 4,673,320 | 6/1987 | Froehlich | 411/45 X |
| 4,770,580 | 9/1988 | Fischer | 411/45 |
| 5,628,579 | 5/1997 | Forster | 403/297 |

FOREIGN PATENT DOCUMENTS

| 2240061 | 2/1974 | Germany . | |
| 2556019 | 6/1977 | Germany | 411/57 |
| 3205928 | 9/1983 | Germany . | |
| 4007088 | 9/1991 | Germany . | |
| 4020402 | 2/1992 | Germany . | |
| 4305381 | 8/1994 | Germany . | |
| 4321300 | 1/1995 | Germany . | |

*Primary Examiner*—Kenneth J. Dorner
*Assistant Examiner*—Andrea Chop
*Attorney, Agent, or Firm*—Anderson Kill & Olick, P.C.

[57] ABSTRACT

An expansion dowel includes an axially extending cylindrically-shaped expansion sleeve (2) having an axially extending expansion region (5) with one of axially extending slots or grooves therein and a central bore (4) tapering inwardly toward a leading end of the sleeve facing in the setting direction (S). The central bore (4) is shaped to receive an expanding member (6). The expanding member (6) has a trailing end face in contact with a safety element (11) for preventing axial displacement of the expanding member (6) opposite to the setting direction. The safety element (11) has a radially outer circumferential surface that can be enlarged in the circumferential direction by a pin-shaped member (7) having a conically-shaped region which can be driven in the setting direction into the safety element. The expanding member (6) is shaped at its trailing end region for receiving a leading end region (9) of the pin-shaped member (7).

20 Claims, 1 Drawing Sheet

EXPANSION DOWEL

BACKGROUND OF THE INVENTION

The present invention is directed to an expansion dowel with an axially extending cylindrically-shaped expansion sleeve having an expansion region with axially extending slots or grooves and with a central bore tapering conically inwardly in the setting direction, that is, toward the leading end, and arranged to receive an expanding member.

Expansion dowels of the generic type are in very wide use. They are utilized in rock, concrete, masonry and similar receiving materials. For instance, an expansion dowel is disclosed in DE-A-43 05 301 and includes a radially deformable expanding member. In such an arrangement, an overload of the receiving material when expanding the expansion dowel is countered. A pin, which can be driven into a bore in the expanding member, limits the radial deformability of the expanding member.

While conventional expansion dowels have excellent holding or retaining values in undamaged or solid receiving materials, such values can be significantly reduced when subjected to a static load if the receiving material is in a broken state. Particularly if linear cracks are present in the receiving material, for instance, in concrete, the opposing force of the receiving material is dissipated and the conically-shaped expanding member moves opposite to the setting direction in the expansion sleeve. This involves a loss of the expanding pressure on the expansion dowel and clearly leads to reduced retention values and, in the worst case, can result in a failure of the anchorage of the dowel.

SUMMARY OF THE INVENTION

Therefore, the primary object of the present invention is to provide an improved expansion dowel of the conventional type, so that adequate retention values can be attained in receiving materials containing cracks or fissures. In particular, the expansion pressure exerted in the expansion dowel cannot be reduced to the extent that it results in a failure of the anchorage.

In accordance with the present invention, the expansion dowel has a special arrangement for the expanding member and a means in contact with the expanding member for preventing axial displacement of the expanding member opposite to the setting direction. In particular, the invention involves an expansion dowel with a cylindrically-shaped axially extending expansion sleeve having an expansion region at its leading end with axially extending slots or grooves in the expansion region as well as a central bore tapering in a conically-shaped manner in the setting direction, that is, toward the leading end and the bore is shaped to receive an expanding member. The expanding member has a trailing end face which borders a safety element preventing axially displacement of the expanding member opposite the setting direction and the safety element has an outside circumference that can be increased with the aid of a pin-shaped member having an axially extending conically-shaped region which can be driven forwardly in the setting direction. The expanding member is shaped to receive an axially extending leading end region of the pin-shaped member. By the inventive arrangement of the expansion dowel with the safety element bordering its trailing end the expanding member is secured against axial displacement opposite to the setting direction. The outside circumference of the safety element can be increased by at least a conically-shaped section of the pin-shaped member during the process of setting the expansion dowel. Due to the increase in the circumference, the safety element is expanded inside a central bore of the expansion sleeve. The expanding member is designed so that it can receive at least an axially extending leading end region of the pin-shaped member. In this way it is assured that the safety element remains in contact with the trailing end face of the expansion member. The expanded safety element prevents the expansion member from displacement inside the expansion sleeve opposite to the setting direction. In this way, adequate retaining values can be achieved in receiving materials which are in a broken or fissured state, for instance, with longitudinally extending fissures which open and close. The loss of expansion pressure is only slight and any breakdown of the anchorage can be avoided.

In a preferred and easily manufactured embodiment, the safety element is an expansion ring having an outside diameter in the initial state equal to or only slightly smaller than the diameter of the adjacent trailing end face of the expanding member. The safety element has a rated failure point on its circumference or it is interrupted by a slot. The diameters of the expansion ring and the expansion member are basically equal. Accordingly, both parts can be driven forward into the central bore of the expansion sleeve when setting the expansion dowel. In this way, the expansion ring remains in direct contact with the expansion member and is finally expanded in that position. This arrangement prevents the expanding member within the expansion sleeve from sliding opposite to the setting direction.

In a particularly advantageous embodiment of the invention, the expanding member is provided with a blind bore which extends in the setting direction from the trailing end face adjacent to the safety element for a portion of its axial extent. The expanding member can also be provided with a throughbore instead of a blind bore. The blind bore or the throughbore serves for receiving at least a leading end region of the pin-shaped member used for widening the expansion ring. In this matter, the expansion ring is not separated from the expanding member, but remains in direct contact with it. The geometry of the blind bore or the throughbore in the expanding member and of the pin-shaped member preferably correspond to one another whereby the pin-shaped member is retained in a captive manner in the blind bore or in the throughbore. Accordingly, the expansion dowel can be stored in a prepared state without any fear of loss of the pin-shaped member.

To reliably prevent the safety element of the expansion dowel, from premature expansion during the setting operation of the dowel, and to be sure a displacement of the pin-shaped member, means are provided for guaranteeing that the pin-shaped member is driven forwardly into its final position only towards the end of the expanding process acting on the expansion sleeve. In a preferred embodiment of the invention, these means comprise a step in the central bore of the expansion sleeve against which the expanding member runs up against at the end of the expanding process. In this way, it is assured that the expansion ring is not prematurely widened, on the other hand the pin-shaped member is moved in the setting direction in each instance in the course of the driving action of the setting tool.

With or without the step in the bore in the expansion sleeve, the diameters of the leading end region of the pin-shaped member and those of the blind bore or the throughbore are matched with one another so that the frictional resistance between the pin-shaped member and the inside wall of the blind bore or the throughbore during most of the setting operation is larger than the frictional resistance between the inside wall of the expansion sleeve and the expanding member. The dimensions of these members is selected in such a way that the frictional resistance relationship reverses only towards the end of the setting procedure.

The expanding effect produced by the expanding member can still be increased or especially so proportioned in the throughbore embodiment that the circumference of the expanding member is widened by driving the pin-shaped member forwardly into the blind bore or into the throughbore. This affords a counteraction of the radial expansion of the expanding member desired for a certain extent for the dissipation of excess expanding pressure upon the receiving material and, at the same time, permits the containment of adequate expanding pressure while preserving the receiving material in the best possible way.

The pin-shaped member and the blind bore or the throughbore are disposed centrally in the expanding member for the achieving as uniform as possible transmission of the expanding forces to the expansion sleeve and to the receiving material.

Although the arrangement of the inventive expansion dowel is suited also to plastic material dowels, where the expanding member, the safety element and the pin-shaped member are formed either of plastics or metal, and embodiment where all of the elements are formed of metal is preferred, since such an embodiment affords the best retention values.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a perfect embodiment of the invention.

DETAILED DESCRIPTION OF THE INVENTION

Figure 1:
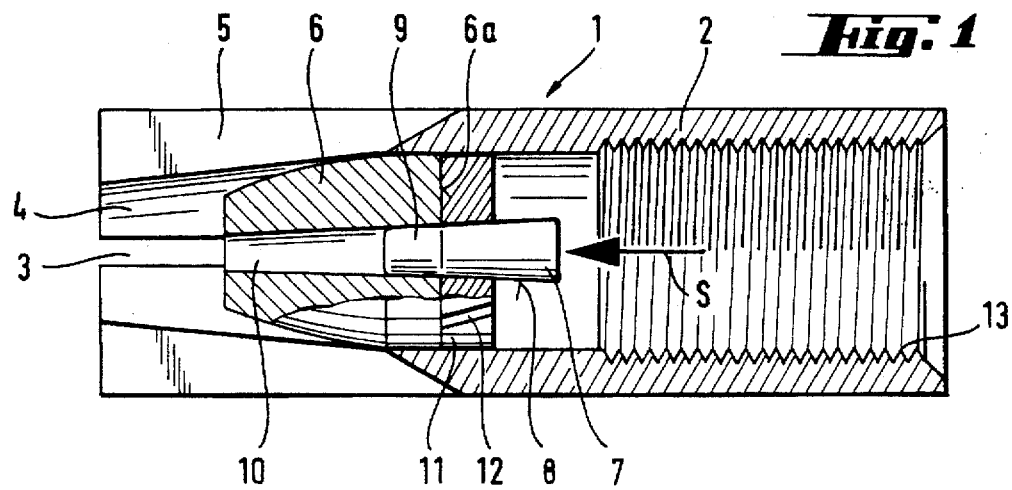
FIG. 1 is an axially extending view of a first embodiment of an expansion dowel incorporating the present invention and shown partly in section and in the unexpanded state.
Figure 2:
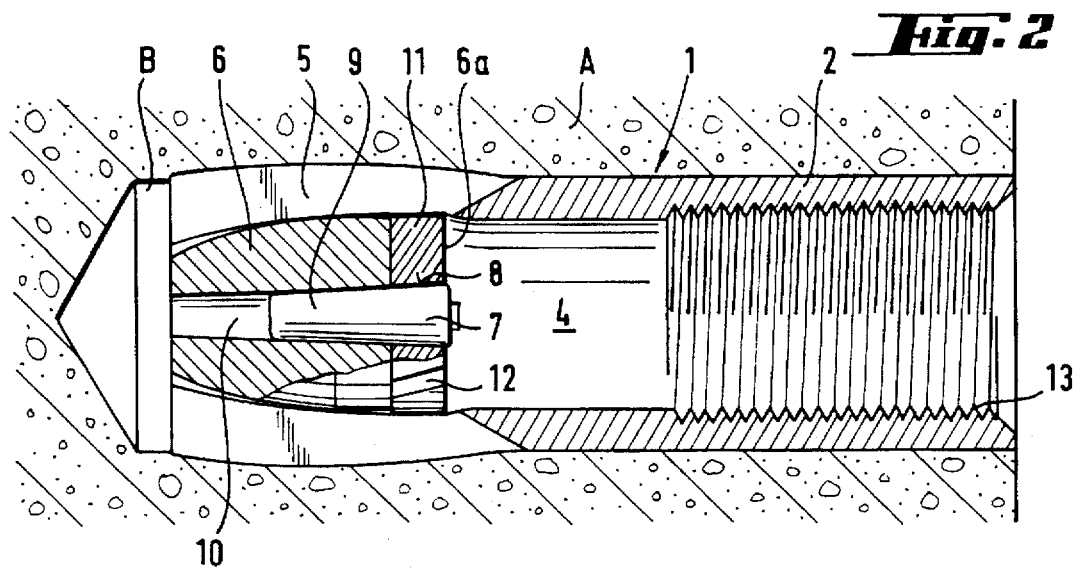
FIG. 2 is a view similar to FIG. 1, however, with the expansion dowel shown in the expanded state.

In FIGS. 1 and 2 a first embodiment of the invention is illustrated with an axially extending expansion dowel. The expansion dowel 1 comprises an axially extending cylindrically shaped expansion sleeve 2 having a leading end shown at the left hand end in FIGS. 1 and 2 and a trailing end at the right-hand end in the drawing. The setting direction is illustrated by the arrow S. The expansion sleeve 2 has an expansion region 5 extending from its leading end toward the trailing end and includes axially extending slots 3 or grooves. Expansion sleeve 2 has an axially extending central bore 4 tapering inwardly in the setting direction S at least in the expansion region 5. The central bore 4 is shaped to receive a conically-shaped expanding member 6 also having a leading end and a trailing end. The trailing end face 6a of the expanding member 6, facing opposite to the setting direction, is in contact with a safety element or expansion ring 11. The outside circumference of the expansion ring 11 can be widened by means of an axially extending pin-shaped member 7. The pin-shaped member 7 has a leading end and a trailing end with a conically-shaped axially extending region 8 extending from its trailing end toward the leading end with the diameter of the conically-shaped region decreasing toward the leading end, so that it widens the expansion ring 11 when it is driven through the central bore in the ring. As can be noted in FIG. 1, the outside diameter of the expansion ring 11 corresponds to the outside diameter of the adjacent trailing end face 6a of the expanding member 6 or is only slightly smaller than it. The expansion ring 11 has a slot 12 at its outside circumference permitting the expansion ring to widen when the pin-shaped member 7 is driven into it in the setting direction S. In place of the slot 12, a rated failure point can also be provided in the expansion ring 11.

Expanding member 6 has an axially extending throughbore 10 into which the leading end region 9 of the pin-shaped member 7 extends. The dimensions of the leading end region 9 of pin-shaped member 7 and throughbore 10 are sized so that the pin-shaped member is retained in a captive manner in the throughbore. In particular, the diameters of the throughbore 10 and of the leading end region 9 of the pin-shaped member 7 are matched to one another, so that the frictional resistance between the inside surface of the throughbore 10 and the pin-shaped member 7 is greater during the initial major portion of the setting process than the resistance opposed to the displacement of the expanding member in the setting direction S at the contacting surfaces of the inside surface of the expansion sleeve 2 and the expanding member 6. In this way, the pin-shaped member 7 is advanced into its final position only towards the end of the setting procedure.

The expansion dowel 1 is shown in its final expanded state in FIG. 2 within a borehole B in receiving material A, where the receiving material is concrete. The expanding member 6 has been driven in the setting direction into its final position of "complete expansion". The axially extending expansion region 5 of the expansion sleeve 2 is widened and pressed against the wall of the borehole B. As is shown in FIG. 2, the expansion ring 11 has an expanded outside diameter relative to the adjacent trailing end face 6a of the expanding member and, in this way, secures the expanding member 6 against displacement in the direction of the lower expansion pressure, that is, opposite to the setting direction S. The portion of the pin-shaped member 7 projecting forwardly from the width of the expansion ring 11 is received in the througbore 10 in the expanding member. The throughbore 10 in the expanding member 6 is preferably shaped to taper inwardly in the setting direction S. This feature along with the conically-shaped trailing end region 8 of the pin-shaped member 7 affords a slight widening of the expanding member 6 when driving the pin-shaped member 7 forwardly into the throughbore 10. The expansion sleeve 2 has engagement means at its trailing end region and, in FIGS. 1 and 2, is shown as an axially extending internal thread 13.

Figure 3:
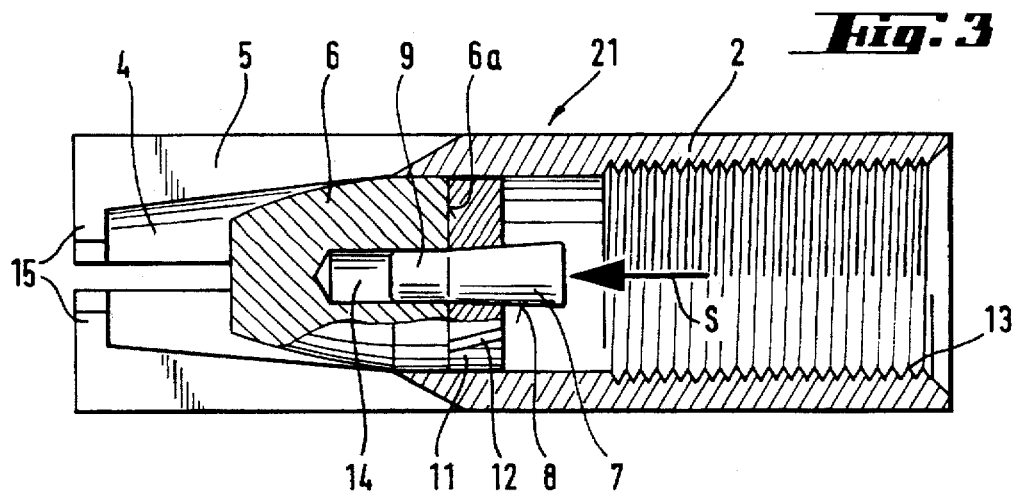
FIG. 3 is a view similar to FIG. 1 of a second embodiment of the expansion dowel of the present invention illustrated in the unexpanded state.

In FIG. 3 the second embodiment of the invention is shown with an axially extending expansion dowel 21 having a leading end at the left-hand end and a trailing end at the right-hand end as viewed in the drawing. Basically, it corresponds to the expansion dowel 1 shown in FIGS. 1 and 2. The fundamental difference in the two embodiments is that the expanding member 6 has a blind bore 14 instead of a throughbore 10. The blind bore 14 is shaped to receive the leading end region 9 of the pin-shaped member 7. A second difference is that the central bore 4 of the expansion sleeve 2 has a inward step 15 in its leading end region. During the setting procedure, the expanding member 6 together with the expansion ring 11 and the pin-shaped member 7 is driven in the setting direction S by a setting tool. At the end of the setting procedure, the expanding member 6 runs up against the step 15 and is prevented from further axially displacement. Accordingly, in further displacement the pin-shaped member 7 is driven in the setting direction and the expansion ring 11 is widened.

The following description of the setting procedure of the expansion dowel 1, 21 of the present invention is provided using the example of low and high strength concrete as the receiving material A. When setting the expansion dowel in low strength concrete, the expanding member 6 can be advanced by the setting tool into its end position of "complete expansion", without any change in position of the pin-shaped member 7. The pin-shaped member 7 is driven into the throughbore 10 or into the blind bore 14 only towards the end of the expanding procedure. Such movement occurs either because the expanding member 6 runs up against the step 15 or because the frictional resistance relationships reverse. When this occurs, the expansion ring 11 is widened and pressed against the inside wall of the central bore 4 in the expansion sleeve 2. The surface of the expansion ring 11 can be provided with profiled surfaces to improve the adhesion of the widened expansion ring to a greater extent.

In high strength concrete, the expanding member 6 is driven forwardly in the setting direction by a setting tool into a position, depending on the level of strength of the concrete, which is above the end position of "complete expansion". During this procedure, the pin-shaped member can be driven slightly into the blind bore 14 or into the throughbore 10. As a result, the expansion ring 11 is already slightly expanded, however, this does not hinder the driving of the expanding member 6. Only after the expanding member 6 has reached its end position, the pin-shaped member 7 is advanced further into the blind bore 14 or the throughbore 10. It is only during this further displacement that the expansion ring 11 is widened to the desired extent. In the case of an expanding member 6 with a blind bore 14, to begin with, the axially extending leading end region 9 of the pin-shaped member 7 is driven into the blind bore 14 until it reaches the bottom of the blind bore. Subsequently, the trailing end region of the pin-shaped member 7 projecting axially outwardly from the expansion ring 11 is deformed until the shoulder of the setting tool comes to rest at the collar of the expansion sleeve.

Preferably, the expansion dowel of the present invention is formed completely of metal.

The inventive concept of the expansion dowel 1, 21 with a safety element 11 is to prevent any inadvertent axial displacement of the expanding member opposite to the setting direction. As a result, adequate retaining values can be achieved in receiving materials having fissures, for instance, elongated fissures which open and close. The loss of expansion pressure is only slight and a breakdown of the anchorage of the dowel is avoided.

While specific embodiments of the invention have been shown and described in detail to illustrate the inventive principles, it will be understood that the invention may be embodied otherwise without departing from such principles.

I claim:

1. An expansion dowel comprises an axially extending cylindrical expansion sleeve (2) having a setting direction (S) with a first end leading in the setting direction (S) and a trailing second end, said sleeve (2) having an expansion region (5) extending axially from the first end toward the second end with at least one of axially extending slots and grooves therein, said sleeve (2) having a central bore (4) therein tapering conically inwardly towards the first end at least in the expansion region (5), an expanding member (6) being located within said central bore (4) for expanding said expansion region (5), said expanding member (6) having a first end face leading in the setting direction and a trailing second end face (6a) and a second bore (10, 14) extending from the second end face toward the first end face, first means (11) in said central bore (4) in contact with said second end face (6a) for preventing axially displacement of said expanding member (6) opposite to the setting direction (S), said first means (11) having an axially extending opening and a radially outer circumferential surface enlargeable by an axially extending pin-shaped member (7) insertable into said opening, said pin-shaped member (7) having a leading end, a trailing end and an axially extending conical region spaced from the leading end thereof and being drivable in the setting direction (S) and having a leading end region extending from the leading end thereof and being arranged to engage in the second bore (10, 14) of said expanding member (6).

2. An expansion dowel, as set forth in claim 1, wherein said first means (11) comprises an expansion ring (11) having an unexpanded state and an expanded state and having a diameter in the unexpanded state not greater than the diameter of the trailing end face (6a) of said expanding member (6), and said expansion ring (11) having a radially outer circumferentially extending surface containing a slot (12).

3. An expansion dowel, as set forth in claim 1 or 2, wherein said second bore (10, 14) of said expanding member (6) is a blind bore (14) extending axially from said trailing second end face (6a) towards said first end face thereof.

4. An expansion dowel, as set forth in claim 1 or 2, wherein said expanding member (6) having a throughbore (10) extending from the trailing second end face (6a) to the first end face thereof.

5. An expansion dowel, as set forth in claim 3, wherein said pin-shaped member (7) being retained in a captive manner in said blind bore (14).

6. An expansion dowel, as set forth in claim 4, wherein said pin-shaped member (7) being retained in a captive manner in said throughbore (10).

7. An expansion dowel, as set forth in claim 5, wherein second means (15) being provided so that said pin-shaped member (7) is driven in the setting direction (S) into an end position during expanding of said expansion sleeve (2).

8. An expansion dowel, as set forth in claim 6, wherein second means (15) being provided so that said pin-shaped member (7) is driven in the setting direction (S) into an end position during expanding of the expansion sleeve (2).

9. An expansion dowel, as set forth in claim 7, wherein said second means (15) comprises an inwardly extending step (15) in said central bore (4) of said expansion sleeve (2) forming a stop for the movement of said expanding member (6) at the end of expanding of the expansion sleeve (2).

10. An expansion dowel, as set forth in claim 8, wherein said second means (15) comprises an inwardly extending step (15) in said central bore (4) of said expansion sleeve (2) forming a stop for the movement of said expanding member (6) at the end of the expanding of the expansion sleeve (2).

11. An expansion dowel, as set forth in claim 7, wherein said leading end region of the pin-shaped member (7) and said blind bore (14) having a diameter corresponding to one another whereby a frictional resistance between said pin-shaped member (7) and an inside surface of said blind bore (14) being greater during an initial portion of expanding of said expansion sleeve (2) than a frictional resistance between an inside wall of said expansion sleeve (2) and the expanding member (6) whereby the frictional resistance relationships reverse only towards a final portion of the expanding of said expansion sleeve (2).

12. An expansion dowel, as set forth in claim 8, wherein said leading end region of said pin-shaped member (7) and said throughbore (10) having diameters matched to one another whereby a frictional resistance between the pin-shaped member (7) and an inside surface of said throughbore (10) being greater during an initial portion of expanding of said expansion sleeve (2) than a frictional resistance between an inside wall of the expansion sleeve (2) and the expanding member (6) whereby the frictional resistance relationships reverse only towards the end of the expanding of said expansion sleeve (2).

13. An expansion dowel, as set forth in claim 9, wherein said leading end region of said pin-shaped member (7) and said blind bore (14) each having a diameter corresponding to one another whereby a frictional resistance between said pin-shaped member (7) and an inside surface of said blind bore (14) is greater during an initial portion of expanding of said expansion sleeve (2) than a frictional resistance between an inside wall of said expansion sleeve (2) and the expanding member (6) whereby the frictional resistance relationships reverse only towards the end of the expanding of said expansion sleeve (2).

14. An expansion dowel, as set forth in claim 10, wherein said leading end region of said pin-shaped member (7) and said throughbore (10) having diameters matched to one another whereby a frictional resistance between the pin-shaped member (7) and an inside surface of said throughbore (10) being greater during an initial portion of expanding of said expansion sleeve (2) than a frictional resistance between an inside wall of the expansion sleeve (2) and the expanding member (6) whereby the frictional resistance relationships reverse only towards the end of the expanding of said expansion sleeve (2).

15. An expansion dowel, as set forth in claim 3, wherein said expanding member (6) being widenable in the circumferential direction of the radially outer circumferential surface of said first means (11) by driving said pin-shaped member (7) in the setting direction (S) into said blind bore (14).

16. An expansion dowel, as set forth in claim 4, wherein said expanding member (6) being widenable in the circumferential direction of the radially outer circumferential surface of said first means (11) by driving said pin-shaped member (7) into said throughbore (10).

17. An expansion dowel, as set forth in claim 15, wherein said pin-shaped member (7) and said blind bore (14) being disposed centrally with respect to said expanding member (6).

18. An expansion dowel, as set forth in claim 16, wherein said pin-shaped member (7) and said throughbore (10) being disposed centrally with respect to said expanding member (6).

19. An expansion dowel, as set forth in claim 3, wherein said expansion sleeve (2), said expanding member (6), said first means (11) and said pin-shaped member (7) are formed of metal.

20. An expansion dowel, as set forth in claim 4, wherein said expansion sleeve (2), said expanding member (6), said first means (11) and said pin-shaped member (7) are formed of metal.

* * * * *

UNITED STATES PATENT AND TRADEMARK OFFICE

CERTIFICATE OF CORRECTION

PATENT NO.    : 5,688,066
DATED         : November 18, 1997
INVENTOR(S)   : Rainer Loose It is certified that error appears in the above-identified patent and that said Letters Patent is hereby corrected as shown below:

On the title page;
[73] Assignee: Hilti Aktiengesellschaft, Fürstentum, Liechtenstein

Signed and Sealed this

Thirteenth Day of January, 1998

Attest:

BRUCE LEHMAN

*Attesting Officer*          *Commissioner of Patents and Trademarks*